Patented Sept. 12, 1939

2,172,606

UNITED STATES PATENT OFFICE 2,172,606

BENZYL-OXYALKYL AROMATIC SULPHONATES

Courtland L. Butler and Leonard H. Cretcher, Pittsburgh, Pa., assignors to Mellon Institute of Industrial Research, a corporation of Pennsylvania No Drawing. Application April 26, 1937, Serial No. 138,936

5 Claims. (Cl. 260—456)

This invention consists in a new group of compositions, the benzyl-oxyalkyl aromatic sulphonates. These substances are valuable reagents in the synthesis of useful organic compounds and medicinals of various types. They may conveniently be used for the introduction of the benzyl-oxy-alkyl and the hydroxyalkyl group into hydroxy, amino, and hydroxy-amino substances, and into medicinal substances, such as alkaloids.

The benzyl-oxyalkyl aromatic sulphates may, we have discovered, readily be prepared by causing reaction to take place between the monobenzyl ethers of various glycols and aromatic sulphonyl chlorides, in the presence of an alkaline condensing agent, such as pyridine. The crystalline or liquid products of reaction are isolated and purified by usual methods, available to the organic chemist.

EXAMPLE 1.—*Preparation of benzyl-oxyethyl benzene sulphonate*

To a cold mixture of 78 parts of ethylene glycol monobenzyl ether and 40 parts of pyridine is slowly added with stirring a mixture of 88 parts of benzene sulphonyl chloride and 30 parts of pyridine. After standing several hours in the cold, the reaction product, benzyl-oxyethyl benzene sulphonate, is worked up according to usual methods. The substance is isolated as a high boiling liquid.

EXAMPLE 2.—*Preparation of benzyl-oxyethyl p-toluene sulphonate*

To a cold mixture of 31 parts of ethylene glycol monobenzyl ether and 30 parts of pyridine is slowly added with stirring 38 parts of p-toluene sulphonyl chloride. The mixture is then allowed to stand several hours. On slow dilution with water, crystalline benzyl-oxyethyl toluene sulphonate separates from the diluted pyridine. It is filtered, washed, dried, and recrystallised, if desired.

EXAMPLE 3.—*Preparation of γ-benzyl oxypropyl p-toluene sulphonate*

In a similar way a mixture of 83 parts of trimethylene glycol monobenzyl ether and 80 parts of pyridine is treated with 95 parts of p-toluene sulphonyl chloride. The crystalline product is worked up in the usual way.

EXAMPLE 4.—*Preparation of 1-benzyloxy 2-propyl p-toluene sulphonate (α-methyl -benzyloxy-ethyl p-toluene sulphone)*

A mixture of 83 parts of propylene glycol 1-monobenzyl ether and 80 parts of pyridine is similarly treated with 95 parts of p-toluene sulphonyl chloride. The crystalline product is worked up in the usual way.

The substances so produced are specifically new; furthermore, they are examples of a new group of substances. Taking these substances as reagents, the benzyl-oxyalkyl derivatives of hydroxylated substances and of amines are readily derived, by alkylation with benzyl-oxyalkyl sulphonate; and the derivatives, in turn, may be converted by acid hydrolysis into hydroxalkyl derivatives, reaction taking place according to the following scheme—

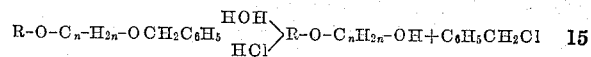

in which R=radical of ROH, the hydroxy compound alkylated with a benzyl oxalkyl aromatic sulphonate.

EXAMPLE 1.—*Preparation of benzyl-oxyethyl phenyl ether*

47 parts of phenyl and 33 parts of 85% KOH are dissolved in alcohol. 153 parts of benzyl-oxyethyl p-toluene sulphonate are added. The mixture is heated on a water bath for 2 hours and the reaction product, a high boiling, water-insoluble liquid is isolated in the usual way.

EXAMPLE 2.—*Preparation of benzyl-oxyethyl (p-dibenzyl oxyethyl-aminophenyl) ether and phenyl morpholine p-hydroxyethyl ether* p-Aminophenol is similarly digested in alkaline alcoholic solution with benzyl-oxyethyl p-toluene sulphonate. The benzyl-oxyethyl (p-dibenzyl-oxyethyl aminophenyl) ether is worked up by the usual methods. It may be converted to a crystalline neutral sulphonate if desired.

Phenyl morpholine p-hydroxyethyl ether is prepared from benzyl-oxyethyl (p-dibenzyl-oxyethyl aminophenyl) ether by converting the latter into hydrochloride salt and hydrolyzing in dilute hydrochloric acid. It yields a crystalline acetate on treatment with acetyl chloride.

EXAMPLE 3.—*Preparation of benzyl-oxyethyl 8-quinolyl ether*

58 parts of 8-hydroxy quinoline are converted to potassium salt in alcoholic solution and digested with 122.4 parts of benzyl-oxyethyl p-toluene sulphonate for two hours on a water bath. The product, benzyl-oxyethyl 8-quinolyl ether is separated in the usual way.

EXAMPLE 4.—*Preparation of hydroxyethyl 8-quinolyl ether*

105 parts of benzyl-oxyethyl 8-quinolyl ether are dissolved in 500 parts of dilute hydrochloric acid containing 130 parts of concentrated acid. On distilling the benzyl group is hydrolyzed off as benzyl chloride which is carried over in the distillate. The resulting hydroxyethyl 8-quinolyl ether is worked up according to the usual methods.

Hydroxyethyl 8-quinolyl ether yields a crystalline hydrochloride with one equivalent of HCl.

EXAMPLE 5.—*Preparation of benzyl-oxyethyl apocupreine using benzyl-oxyethyl-benzene sulphonate*

30 parts of apocupreine are converted to potassium salt in alcoholic solution, and digested for two hours on a water bath with 26 parts of benzyl-oxyethyl-benzene sulphonate. The reaction product, benzyl-oxyethyl apocupreine, is worked up in the usual way. The substance may be conveniently recrystallized from acetone, if desired.

EXAMPLE 6.—*Preparation of benzyl-oxyethyl apocupreine using benzyl-oxyethyl p-toluene sulphonate*

In a similar way 50 parts of apocupreine in the form of its potassium salt in alcoholic solution are treated with 48 parts of benzyl-oxyethyl p-toluene sulphonate, and the product, benzyl-oxyethyl apocupreine, is worked up by the usual method.

EXAMPLE 7.—*Preparation of benzyl-oxyethyl apocupreine from B-chloroethyl apocupreine*

B-chloroethyl apocupreine is prepared in the usual way by alkylating the potassium salt of apocupreine with B-chloroethyl p-toluene sulphonate.

90 parts of B-chloroethyl apocupreine are digested with benzyl alcohol in which is dissolved 6.5 parts of sodium. The reaction mixture is diluted with ether, and the solution filtered from sodium chloride. The desired product, benzyl-oxyethyl apocupreine, is extracted from the ether solution with dilute sulphuric acid and worked up in the usual way.

EXAMPLE 8.—*Preparation of benzyl-oxyethyl hydrocupreine*

90 parts of hydrocupreine are converted to potassium salt in alcoholic solution and warmed for two hours with 88 parts of benzyl-oxyethyl p-toluene sulphonate. The desired product, benzyl-oxyethyl hydrocupreine, is worked up according to the usual methods.

EXAMPLE 9.—*Preparation of Γ-benzyloxypropyl apocupreine*

46 parts of apocupreine in the form of potassium salt in alcoholic solution are similarly treated with 48 parts of Γ-benzyloxypropyl p-toluene sulphonate. The desired product, Γ-benzyloxypropyl apocupreine, is worked up in the usual way.

EXAMPLE 10.—*Preparation of benzyloxy-2-propyl apocupreine (α-methyl β-benzyloxyethyl apocupreine)*

62 parts of apocupreine in the form of potassium salt in alcoholic solution are similarly treated with 64 parts of 1-benzyloxy-2-propyl p-toluene sulphonate (α-methyl β-benzyloxyethyl p-toluene sulphonate). The 1-benzyloxy 2-propyl apocupreine (α-methyl β-benzyloxyethyl apocupreine is worked up in the customary manner.

EXAMPLE 11.—*Preparation of hydroxyethyl apocupreine from benzyl-oxyethyl apocupreine*

9 parts of benzyl-oxyethyl apocupreine are dissolved in 60 parts of dilute hydrochloric acid containing 16 parts of concentrated hydrochloric acid. On distillation the benzyl group is hydrolyzed off as benzyl chloride which is carried over in the distillate. The last of the benzyl chloride is removed by steam distillation. Hydroxyethyl apocupreine remains in the acid solution in the reaction vessel. It is worked up by the usual procedures.

EXAMPLE 12.—*Preparation of hydroxyethyl hydrocupreine from benzyl-oxyethyl hydrocupreine*

In a similar way benzyl-oxyethyl hydrocupreine is hydrolyzed in dilute hydrochloric acid to hydroxyethyl hydrocupreine and the product is worked up in the ordinary way.

EXAMPLE 13.—*Preparation of Γ-hydroxypropyl apocupreine from benzyloxypropyl apocupreine*

In a similar way Γ-benzyl oxypropyl apocupreine is hydrolyzed in dilute hydrochloric acid to Γ-hydroxypropyl apocupreine and the product worked up as usual.

EXAMPLE 14.—*Preparation 1-hydroxy 2-propyl apocupreine (α-methyl β-hydroxyethyl apocupreine) from 1-benzyloxy 2-propyl apocupreine (α-methyl β-benzyloxyethyl apocupreine)*

1-benzyloxy 2-propyl apocupreine (α-methyl β-benzyloxyethyl apocupreine) is similarly hydrolyzed in dilute hydrochloric acid and the product, 1-hydroxy 2-propyl apocupreine, is worked up in the usual manner.

We claim as our invention:

1. A compound responsive to the formula

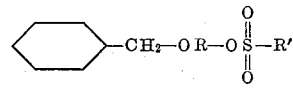

where OR is an oxyalkyl group selected from oxyethyl and oxypropyl and R' is an aryl radical of the benzene series.

2. As a new composition of matter, benzyl-oxyethyl benzene sulphonate,

$C_6H_5SO_3CH_2CH_2OCH_2C_6H_5$

3. As a new composition of matter, benzyl-oxyethyl p-toluene sulphonate,

$C_7H_7SO_3CH_2CH_2OCH_2C_6H_5$

4. As a new composition of matter, Γ-benzyloxypropyl p-toluene sulphonate,

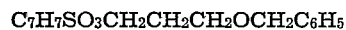

$C_7H_7SO_3CH_2CH_2CH_2OCH_2C_6H_5$

5. As a new composition of matter, 1-benzyloxy 2-propyl p-toluene sulphonate (α-methyl β-benzyloxyethyl p-toluene sulphonate),

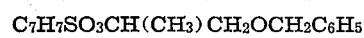

$C_7H_7SO_3CH(CH_3)CH_2OCH_2C_6H_5$

COURTLAND L. BUTLER.
LEONARD H. CRETCHER.